United States Patent
Kunnath et al.

(10) Patent No.: US 10,984,078 B2
(45) Date of Patent: Apr. 20, 2021

(54) SYSTEMS AND METHODS FOR IMPROVED AUTHENTICATION

(71) Applicant: VMware, Inc., Palo Alto, CA (US)

(72) Inventors: Ramanandan Nambannor Kunnath, Bangalore (IN); Sruthi Surendran, Bangalore (IN); Rakesh Muraleedharan Nair, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 338 days.

(21) Appl. No.: 16/035,812

(22) Filed: Jul. 16, 2018

(65) Prior Publication Data

US 2020/0019678 A1 Jan. 16, 2020

(51) Int. Cl.
| | |
|---|---|
| *G06F 21/12* | (2013.01) |
| *G06F 21/44* | (2013.01) |
| *H04L 9/32* | (2006.01) |
| *G06F 21/41* | (2013.01) |
| *G06F 3/0481* | (2013.01) |
| *H04L 29/06* | (2006.01) |

(52) U.S. Cl.
CPC ............ *G06F 21/121* (2013.01); *G06F 21/41* (2013.01); *G06F 21/44* (2013.01); *H04L 9/3213* (2013.01); *H04L 63/0815* (2013.01); *G06F 3/04817* (2013.01)

(58) Field of Classification Search
CPC ........ G06F 21/121; G06F 21/41; G06F 21/44; G06F 3/04817; H04L 9/3213; H04L 63/0815
See application file for complete search history.

(56) References Cited

U.S. PATENT DOCUMENTS

| | | | |
|---|---|---|---|
| 8,695,077 B1* | 4/2014 | Gerhard ................ | H04L 63/083 726/8 |
| 9,413,745 B1* | 8/2016 | Rowley .................. | G06F 21/33 |
| 10,057,246 B1* | 8/2018 | Drozd .................... | G06F 21/335 |
| 10,200,351 B2* | 2/2019 | Gustavson .......... | H04L 63/0815 |
| 2003/0135628 A1* | 7/2003 | Fletcher ................ | H04L 67/02 709/229 |

(Continued)

FOREIGN PATENT DOCUMENTS

| | | | |
|---|---|---|---|
| CN | 101998406 A | * | 3/2011 |
| CN | 101998407 B | * | 7/2014 |

(Continued)

*Primary Examiner* — Techane Gergiso
(74) *Attorney, Agent, or Firm* — Clayton, McKay & Bailey, PC

(57) ABSTRACT

When a user attempts to access a first application installed on a user device, it can send an authentication request to an authentication server. The authentication server can assign a unique request token to the request and load a script to a component of the operating system executing on the user device that displays content within the first application. The script can cause a portal application to launch on the user device. The portal application can send a request to the authentication server on behalf of the user, including the unique request token and an access token stored by, or accessible to, the portal application. The authentication server can receive the request from the portal application and validate the request based on the unique request token and the access token. Upon validating the request, the authentication server can authenticate the user at the first application.

17 Claims, 3 Drawing Sheets

(56) References Cited

U.S. PATENT DOCUMENTS

| | | | | |
|---|---|---|---|---|
| 2004/0128392 A1* | 7/2004 | Blakley, III | .......... | H04L 63/083 |
| | | | | 709/229 |
| 2004/0205473 A1* | 10/2004 | Fisher | ............ | H04L 67/28 |
| | | | | 715/255 |
| 2004/0268154 A1* | 12/2004 | Ullrich | ............ | G06F 21/31 |
| | | | | 726/4 |
| 2005/0044197 A1* | 2/2005 | Lai | ............ | H04L 67/16 |
| | | | | 709/223 |
| 2015/0235042 A1* | 8/2015 | Salehpour | ............ | G06F 21/44 |
| | | | | 726/4 |
| 2016/0021097 A1* | 1/2016 | Shrotri | ............ | H04L 63/0815 |
| | | | | 726/8 |
| 2017/0026362 A1* | 1/2017 | O'Donnell | ............ | H04L 63/0815 |
| 2017/0048319 A1* | 2/2017 | Straub | ............ | H04W 12/0027 |
| 2017/0374551 A1* | 12/2017 | Shen | ............ | H04L 29/06 |
| 2018/0077143 A1* | 3/2018 | Sridharan | ............ | G06Q 10/10 |
| 2019/0132321 A1* | 5/2019 | Pitchaimani | ............ | H04W 12/06 |

FOREIGN PATENT DOCUMENTS

| | | | | |
|---|---|---|---|---|
| CN | 106331003 A | * | 1/2017 | |
| CN | 108156119 A | * | 6/2018 | |

* cited by examiner

SYSTEMS AND METHODS FOR IMPROVED AUTHENTICATION

BACKGROUND

The number of software applications on a typical device continues to grow over time. Many of these applications require some sort of credentials or authentication to confirm the identity of the user. To help users keep up with their expanding pool of usernames and passwords, single-sign-on ("SSO") solutions have been created and used effectively.

SSO solutions can provide access to multiple applications and software systems based on a user authenticating once at a single application or server. An example SSO solution is provided by portal applications, such as VMWARE's WORKSPACE ONE application. A portal application can receive and store a user's credentials and provide a selection of applications from which the user can choose to launch. When launched from within the portal application, the application can be authenticated using the credentials stored by the portal application. As a result, the user can seamlessly open and use applications without manually entering credentials each time.

But in some examples, a user might want to use an application for which the required credentials are not managed by the portal application. For example, the user can download a third-party application that requires separate authentication at an identity service. If that third-party application is not integrated with the user's SSO solution, the user will be required to manually enter credentials each time they use the application. This reduces the benefit of SSO in the overall user experience.

As a result, a need exists for improved authentication methods that streamline the authentication process for users. More specifically, a need exists for authentication methods that provide SSO for applications that require separate authentication and do not require making changes to those applications.

SUMMARY

Examples described herein include systems and methods for improved authentication. An example method can include receiving, at an authentication server, a request to authenticate a first application executing on a user device. The authentication server can assign a unique request token to the request received from the first application. The authentication server can also load a script, or cause the loading of a script, to a component that executes on the user device and displays content within the first application. The component can be a component of an operating system executing on the user device, such as a WEBVIEW component in the ANDROID operating system. For example, the component can include functions of the WEBVIEW class. The script can also include the unique request token.

Once loaded to the component, the script can cause a portal application executing on the user device to launch. The portal application can be an application that stores a user's credentials and displays icons corresponding to a plurality of applications available to the user and can provide SSO access to a selected application by authenticating the user to the selected application. In some examples, the first application is not available for selection within the portal application. The portal application can send a request to the authentication server on behalf of the user. The request can include the unique request token provided with the script, as well as an access token stored by, or accessible to, the portal application.

The authentication server can receive the request from the portal application and validate the request based on the unique request token and the access token. If the access token needs to be refreshed, the authentication server can request a refreshed access token from the portal application. Upon validating the request, the authentication server can authenticate the user at the first application. The user can therefore authenticate at the first application without manually entering credentials for the first application.

If the process stalls or otherwise takes longer than a predetermined period of time without successfully authenticating the user at the first application, the user can be redirected to an authentication interface for the authentication server to manually enter the required credentials.

The example methods summarized above can be incorporated into a non-transitory, computer-readable medium having instructions that, when executed by a processor associated with a computing device, cause the processor to perform stages for dynamically determining enrollment requirements and enrolling a user device into a management system. Additionally, the example methods summarized above can be implemented in a system including, for example, a user device and an authentication server.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

When a user attempts to access a first application installed on a user device, the first application can send a request to an authentication server for authenticating the user. The authentication server can assign a unique request token to the request received from the first application and load a script (which can include causing the loading of a script) to a component of the operating system executing on the user device that displays content within the first application. The script can cause a portal application, executing on the user device, to launch. The portal application can send a request to the authentication server on behalf of the user, including the unique request token and an access token stored by, or accessible to, the portal application. The authentication server can receive the request from the portal application and validate the request based on the unique request token and the access token. Upon validating the request, the authentication server can authenticate the user at the first application.

This can allow the user to avoid entering credentials for the first application, which can be a third-party application, even though they have completed an SSO process already.

Figure 1:
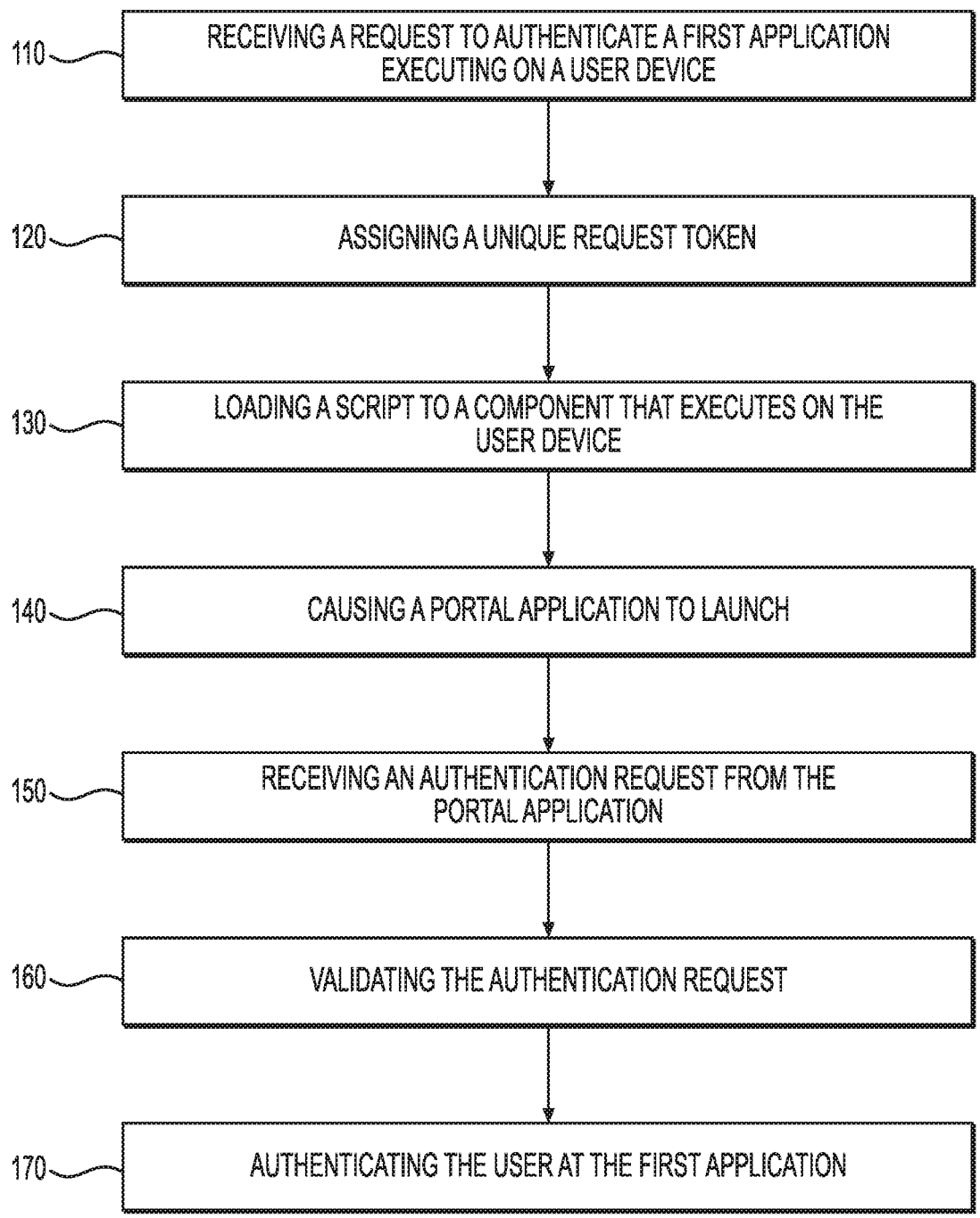
FIG. 1 is a flowchart of an example method for performing authentication for an application.
Figure 2:
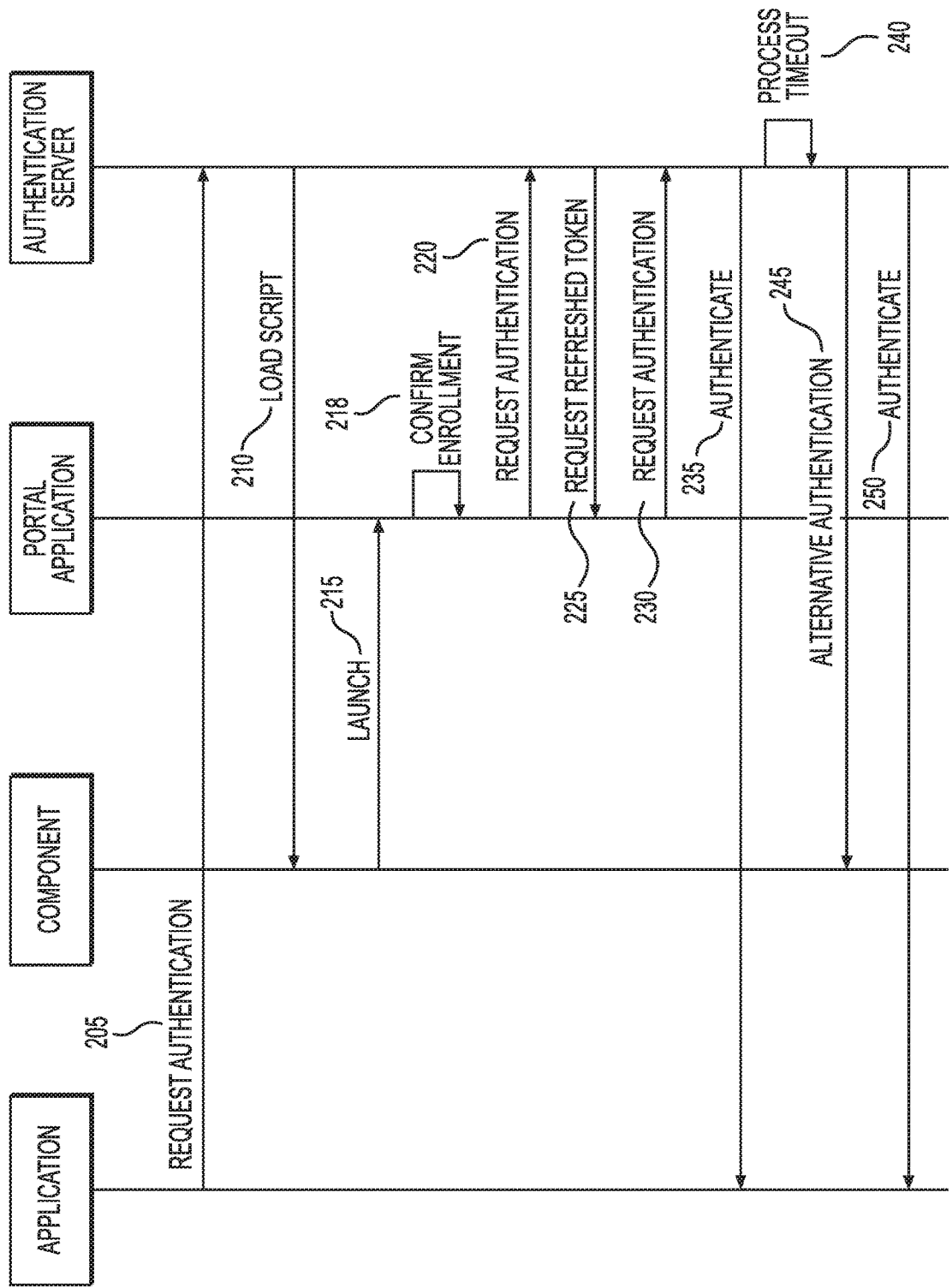
FIG. 2 is a sequence diagram of an example method for performing authentication for an application.
Figure 3:
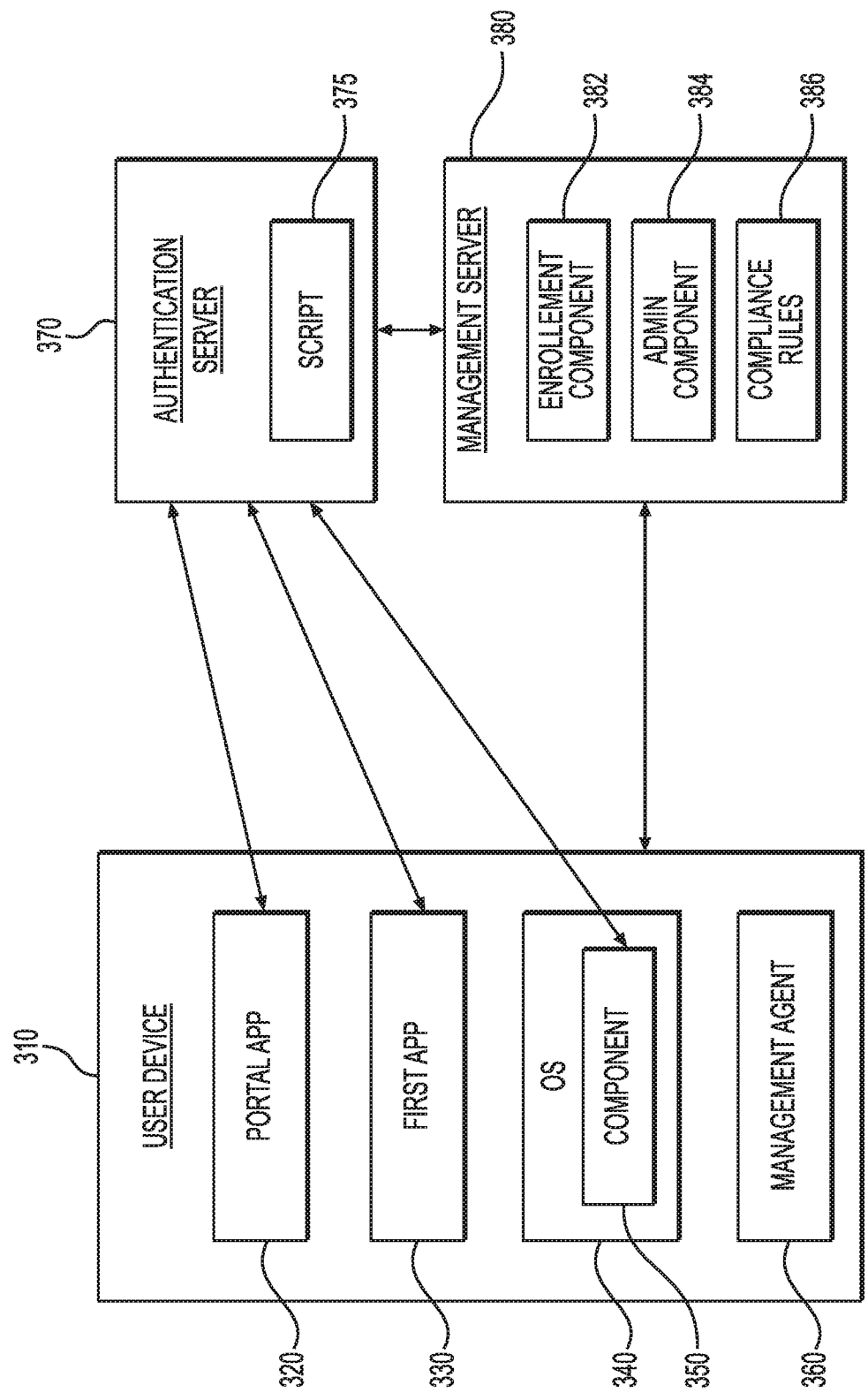
FIG. 3 is a system diagram of an example system for performing the example authentication methods disclosed herein.

FIG. 1 provides a flowchart of an example method for performing authentication for an application. FIG. 2 provides a sequence diagram of an example method for performing authentication for an application. FIG. 3 provides a system diagram of an example system for performing the example authentication methods disclosed herein.

Turning to FIG. 1, stage 110 can include receiving a request to authenticate a first application executing on a user device. The request can originate at a user device, based on a user attempting to launch or access the first application. The user device can be any computing device, such as a smartphone, laptop, tablet, personal computer, or workstation. A user device can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The request can be sent by the first application to an authentication server. For example, the first application can be programmed such that authentication requests are handled by or redirected to an authentication server remote from the user device. The authentication server can be an identity management server such as VMWARE IDENTITY MANAGER (vIDM). The authentication server can be a server, computing device, or network of multiple servers or computing devices, having one or more processors and memory stores. The authentication server can control access to applications or enterprise data by, for example, issuing an access token to a user device that allows the user device to access one or more enterprise resources. The applications can communicate directly with the authentication server via a network, such as the Internet.

In some examples, an application can communicate with the authentication server through an intermediate server that reroutes an authentication request to the authentication server. For example, if the first application is an email client, access to an email account can be controlled by an email server such as a MICROSOFT EXCHANGE server. In that example, the email server can be configured to route an authentication request to the authentication server at stage 110.

Stage 120 can include assigning a unique request identifier to the request from the first application. The unique request identifier can be assigned by generating a token or certificate that includes the unique request identifier. It can also be assigned by inserting the unique request identifier into a header, payload, or other portion of a communication sent by the authentication server. The unique request identifier can identify the request itself, the authentication session, the requesting user device, the user, the first application, or some combination thereof.

Stage 130 can include loading a script to a component that executes on the user device. The component can be a software component, such as a component of the operating system executing on the device. The component can display content within one or more applications on the user device. As a non-limiting example, the ANDROID operating system includes a WEBVIEW component that can display web content within any application configured to allow for it. The component can receive information from a web location, server, device, or other source and cause the operating system or first application, or both, to display content or perform other actions.

The script loaded to the component can have multiple portions. In a first portion, the script can include the unique request identifier. This can include, for example, a unique request identifier token that accompanies the script or a header, payload, or other portion of the script that includes the unique request identifier.

In a second portion, the script can include an instruction to confirm enrollment of the user device. At stage 140, the instruction can trigger a background service on the user device that determines whether the user device is enrolled in a relevant Enterprise Mobility Management ("EMM") system. The background service can be invoked by a portal application, as explained below. In the example of an ANDROID operating system, the instruction can be an "intent" that triggers the enrollment inquiry. The process of enrollment is described in more detail with respect to FIG. 3.

The enrollment inquiry can be directed toward an application or component on the user device that stores enrollment information, to a management server that stores enrollment information, or to a combination of both. In one example, the instruction at stage 140 triggers a query to a portal application executing on the device. The portal application can be an application that stores a user's credentials and displays icons corresponding to a plurality of applications available to the user. The portal application can provide SSO access to a selected application by authenticating the user to the selected application. The portal application can also store enrollment information, such as a token or certificate indicating that the user device is enrolled in the EMM system.

The portal application can request refreshed tokens or certificates from a management server to confirm continued compliance. In some examples, the portal application requests a refreshed token or certificate based on a predetermined time period. The portal application can also request a refreshed token or certificate on demand if necessary. In response to the query triggered by the script loaded on the component, the portal application can confirm that the user device is enrolled and take further action, as explained in later stages of FIG. 1.

In some examples, enrollment can be confirmed by a management agent executing on the device. The management agent can be an application installed on the user device as part of an enrollment process. The management agent can include device-level components and application-level components. The management agent can also include system-level privileges, such as privileges to communicate directly with a management server. The management agent can enforce settings, such as compliance rules, that are specified at the management server. It can also enforce the compliance rules by carrying out actions specified by the management server.

The management agent can confirm that the user device is enrolled with the EMM system. The management agent can confirm this directly, based on a valid token or certificate stored on the device. In some examples, the management agent can send a confirmation request to a management server that stores enrollment information. The management agent can receive a confirmation or denial from the management server. In some examples, the management agent can communicate an enrollment status with the portal application. In other examples, the management agent can be a part of the portal application.

Upon confirming enrollment, at stage 150 the portal application can send an authentication request to the authentication server. The request can include the unique request identifier assigned by the authentication server at stage 120. The request can also include an indication that the user device is enrolled and compliant. For example, the indication can be an access token or certificate stored at the user device. In some examples, the token or certificate is the same token or certificate used to confirm compliance as discussed above with respect to stage 140.

At stage 160, the authentication server can validate the request received from the portal application at stage 150. This can include extracting the unique request identifier included in the request and matching it to the unique request identifier assigned at stage 120. This can allow the authentication server to confirm that the request from the portal application is related to the request from the first application. The request at stage 160 can also include validating the access token or certificate provided by the portal application. This can include, for example, confirming that the token or certificate matches a known format and confirming that the token or certificate is up to date. If the token or certificate is outdated or expired, this stage can include requesting a refreshed token or certificate from the portal application. In that example, the portal application can request an updated token or certificate from the management server, either directly or by utilizing the management agent.

After validating the request from the portal application, at stage 170 the authentication server can authenticate the user at the first application. From the perspective of the first application, the authentication at stage 170 can be a direct response to the authentication request sent by the first application at stage 110.

FIG. 2 provides a sequence diagram of an example method for performing authentication for an application, such as the first application described above. At stage 205, the application request authentication at an authentication server. The request can originate at a user device, based on a user attempting to launch or access the application. As explained above, the authentication server can be an identity management server such as vIDM. The request at stage 205 can come directly from the application, or it can come from an intermediate server that reroutes an authentication request to the authentication server. For example, if the first application is an email client, access to an email account can be controlled by an email server such as a MICROSOFT EXCHANGE server. In that example, the email server can be configured to route an authentication request to the authentication server at stage 205.

At stage 210, the authentication server loads a script to a component executing on the user device. The component can be a software component, such as a component of the operating system executing on the device. The component can display content within one or more applications on the user device. As a non-limiting example, the ANDROID operating system includes a WEBVIEW component that can display web content within any application configured to allow for it. The component can receive information from a web location, server, device, or other source and cause the operating system or first application, or both, to display content or perform other actions.

The script can include a unique request identifier assigned by the authentication server to the authentication session opened in response to the request at stage 205. This can include, for example, a unique request identifier token that accompanies the script or a header, payload, or other portion of the scrip that includes the unique request identifier. The script can also include an instruction to confirm enrollment of the user device. The instruction can include, for example, launching a portal application to confirm enrollment.

At stage 215, the component can execute the script and cause the portal application to launch. This stage can be performed by a background process, such as a operating-system level process that operates without making the user aware of the process. The background process can cause the application to launch at stage 215 and confirm enrollment of the user device at stage 218.

When the portal application launches, it can prompt the user for an authentication check in order to provide heightened security. The check can request a passcode, such as a four-digit passcode. The check can additionally or alternatively be a password or username and password combination. The check can include a biometric identification such as a fingerprint, retinal scan, facial scan, or any other type of biometric identification. In some examples, the check is performed by the portal application. The check can be performed locally on the device, such that the device itself confirms the identity of the user before continuing. In some examples, however, the check can be performed at a management server, authentication server, or other location. The user can be prompted with the authentication check based on the portal application being launched, in one example. In some examples, the authentication check occurs periodically, such that a user does not have to provide credentials more than one within a predetermined period of time.

The portal application can confirm enrollment at stage 218 in multiple ways. In one example, the portal application can contact a management server that stores enrollment information. The portal application can identify the user device, such as by providing a device identification, allowing the management server to match the device identification to enrollment records. The management server can confirm enrollment and provide the portal application with a confirmation. The confirmation can include an access token or certificate, for example.

In some examples, the portal application can perform the enrollment check without contacting the management server at this time. For example, the portal application can periodically request an access token or certificate to provide SSO services for various applications available through the portal application. The management server can confirm enrollment of the user device at each of these periodic requests. The access token or certificate can be stored in a memory store of the user device. At stage 218, the portal application can check for a stored access token or certificate, and if one exists on the device, the portal application can confirm enrollment. In some examples, a management agent can perform some or all of the steps performed by the portal application for confirming enrollment.

At stage 220, the portal application can send a request to the authentication server, requesting that the user be authenticated to use the application that initiated the request at stage 205. The request at 220 can include the unique request identifier assigned by the authentication server. By including the unique request identifier, the authentication server can correlate the request at stage 220 to the request at stage 205. The request from the portal application at stage 220 can also include an access token or certificate, such as the access token or certificate used to confirm enrollment at stage 218. The access token of the portal application can include the unique request identifier. This can allow the authentication server to tie the authentication of the application to the SSO of the portal application, as described in the following stages.

The authentication server can attempt to validate the access token or certificate received at stage 220. If the token or certificate is outdated, expired, or otherwise invalid, the authentication server can request a refreshed token or certificate from the portal application at stage 225. The portal application can retrieve a new token or certificate from the management server and provide it to the authentication server at stage 230. Stage 230 can include providing only the refreshed token or certificate but can also include resubmitting the authentication request of stage 220 along with the refreshed token or certificate.

Upon successful validation of the access token or certificate at stages 220 or 230, the authentication server can authenticate the user to the application at stage 235. This stage can include responding to the application's request at stage 205, providing an indication that the user is allowed to sign in or otherwise use the application.

During execution of the various stages of FIG. 2, the amount of time elapsed can be tracked to ensure that the user is not waiting too long to authenticate. The time can be tracked by the component, portal application, or authentication server, for example. In the example of FIG. 2, the process is timed by the authentication server at stage 240. The authentication server can begin a timer upon receiving the authentication request at stage 205, for example. In another example, the authentication server can begin a timer upon loading a script at stage 210. Any stage of FIG. 2 can be used as a starting point for the timer. The successful authentication at stage 235 can pause or end the timer.

In some examples, the timer can be used in conjunction with a time limit. If successful authentication at stage 235 has not occurred before the timer meets or surpasses the time limit, then the authentication process can be modified as desired. In the example of FIG. 2, the authentication server processes a timeout at stage 240. The example at stage 240 is optional. If the authentication at stage 235 occurs within the time limit, no further action is taken and the user is authenticated for the application.

If, on the other hand, the authentication at stage 235 does not occur within the time limit, then at stage 245 the authentication server can initiate an alternative authentication. The alternative authentication can be the default authentication that would typically occur, if not for stages 210-235. For example, the authentication server can display an authentication interface at the component at stage 245. For example, a WEBVIEW component can present the authentication interface at the user device. The authentication interface can include fields for the user to enter a username and password, for example. Any type of authentication can be used at stage 245, as desired. Upon receiving the required credentials, the authentication server can authenticate to the user for the application at stage 250. In this manner, the user either receives a quick, automatic authentication that occurs within a time limit (such as 3 seconds), or else the user is presented with an authentication interface.

FIG. 3 provides a system diagram of an example system for performing the example authentication methods disclosed herein. FIG. 3 discloses a user device 310, which can be any computing device, such as a smartphone, laptop, tablet, personal computer, or workstation. The user device 310 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The user device 310 can also include a portal application 320. The portal application 320 can be an application that stores a user's credentials and displays icons corresponding to a plurality of applications available to the user. The portal application 320 can provide SSO access to a selected application by authenticating the user to the selected application. The portal application 320 can also store enrollment information, such as a token or certificate indicating that the user device 310 is enrolled in the EMM system. In some examples, the user device 310 stores the enrollment token or certificate but provides access to the portal application 320.

The portal application 320 can provide a "portal" by, for example, displaying multiple icons associated with different applications. For example, one icon can be associated with BOXER, another icon can be associated with MICROSOFT EXCEL, and yet another icon can be associated with SALESFORCE. By selecting one of these icons through the graphical user interface presented by the portal application 320, a user can access the applications associated with those icons. An example portal application 320 is VMWARE's WORKSPACE ONE.

The portal application 320 can provide access to the displayed applications by authenticating the user and/or user device 310 with the selected application on behalf of the user. For example, the portal application 320 can store a user's credentials and other pertinent information. When the user selects an application displayed in the portal, the portal application 320 can authenticate the user by using an SSO service. As a result, the user only needs to login to the portal application 320 in order to access a variety of other applications without additional logins required.

In some examples, the portal application 320 provides access to enterprise data, including secure applications (such as an enterprise email account through BOXER), virtual applications, and virtual computer desktops. Enterprise data can be any data associated with an enterprise that is confidential. In some examples, enterprise data is any data that can only be accessed if the user device 310 is enrolled in the EMM or MDM system associated with that enterprise.

The user device 310 can also include a first application 330 separate from the portal application 320. The first application 330 can be a third-party application, a native application, or any other type of application. In some examples, the first application 330 is not included in a group of applications selectable for SSO through the portal application 320. In one example, the first application 330 is MICROSOFT OUTLOOK.

The user device 310 can also include an operating system 340 having a component 350. The operating system 340 can be any software stored on the user device 310 that manages hardware and software aspects of the user device 310 and supports at least the basic functionality of the user device 310. Example operating systems 340 include WINDOWS, iOS, and ANDROID.

Regardless of the type of operating system 340 on the user device 310, the operating system 340 can include at least one component 350. The component 350 can be any component of an operating system 340, such as a WEBVIEW component in the ANDROID operating system 340. The component 350 can execute on the user device 310 and display content within the first application 330. The component 350 can be a component that displays web content for a variety of applications on the device 310, including applications supported by the portal application 320 or the portal application 320 itself. In one example, this is accomplished using the WEBVIEW class available in ANDROID.

The user device 310 can also include a management agent 360 to assist with enrollment and compliance matters. The management agent 360 can be an application installed on the user device 310 as part of an enrollment process. The management agent 360 can include device-level components and application-level components. The management agent 360 can also include system-level privileges, such as privileges to communicate directly with a management server 380. The management agent 360 can enforce settings, such as compliance rules 386, that are specified at the management server 380. It can also enforce the compliance rules 386 by carrying out actions specified by the management server 380.

The management agent 360 can confirm that the user device 310 is enrolled with the EMM system. The management agent 360 can confirm this directly, based on a valid token or certificate stored on the device 310. In some examples, the management agent 360 can send a confirmation request to the management server 380, which stores enrollment information. The management agent 360 can receive a confirmation or denial from the management server 380. In some examples, the management agent 360 can communicate an enrollment status with the portal application 320. In other examples, the management agent 360 can be a part of the portal application 320 itself.

The management server 380 can include an enrollment component 382 and an administrator component 384, either or both of which can be used for the process of enrolling a user device 310. For example, the user device 310 can communicate with the enrollment component 382 during the initial stages of enrollment. In some examples, the enrollment component 382 can provide a token to the user device 310 indicating that the device 310 has been authenticated and is permitted to communicate and enroll with the management server 380. The management server 380 or enrollment component 382 can provide the user device 310 with information regarding how to access and communicate with the administrator component 384 to continue the enrollment process.

In some examples, the administrator component 384 can request a token from the user device 310, indicating that the user device 310 has been authenticated and is permitted to continue the enrollment process with the administrator component 384. Upon receiving the token, the administrator component 384 can continue the enrollment process. The administrator component 384 can also provide a console for an administrator to configure and monitor the status of the user device 310 and the enrollment process. In some examples, the administrator component 384 can be dedicated to a particular enterprise or group of enterprises, while the enrollment component 382 can be shared across multiple different enterprises.

The management server 380 can also include compliance rules 386. A compliance rule 386 can set forth one or more conditions that must be satisfied in order for a user device 310 to be deemed compliant. If compliance is broken, the management server 380 can take steps to control access of the user device to enterprise files, applications, and email. Compliance rules 386 can be assigned differently to the different organizational groups. In addition, compliance rules 386 can be assigned differently to different devices assigned to the same user. Compliance rules 386 can provide access to enterprise files to the user device 310 based on the user's organization group or other criteria. Meanwhile, compliance rules 386 can cause the user device 310 to be wiped if it leaves a geographic area, is jailbroken, or if the management agent 360 is removed or disabled.

In some examples, a compliance rule 386 can specify one or more triggering conditions. If a triggering condition occurs, the system can react accordingly. For example, the management server 380 can automatically perform one or more remedial actions. In another example, the management server 380 can prompt an administrator to take one or more remedial actions. In some cases, remedial actions can be staged, such that the user of a user device 310 is provided with a chance to remedy their noncompliance before being subjected to stricter remedial actions.

Throughout this disclosure, the phrase "confirm enrollment" is used to describe the process of confirming that a user device 310 is enrolled with the management server 380. It can also mean, additionally or alternatively, confirming that the user device 310 is compliant with any applicable compliance rules 386. For example, stage 218 of FIG. 2 is described as an "enrollment" confirmation, but it is also understood to potentially include confirming compliance as well as, or in addition to, confirming enrollment.

The system of FIG. 3 can also include an authentication server 370 as described with respect to FIGS. 1 and 2. The authentication server 370 can be an identity management server such as vIDM. The authentication server 370 can be a server, computing device, or network of multiple servers or computing devices, having one or more processors and memory stores. The authentication server 370 can control access to applications or enterprise data by, for example, issuing an access token to a user device 310 that allows the user device 310 to access one or more enterprise resources. The applications can communicate directly with the authentication server 370 via a network, such as the Internet.

In some examples, an application, such as the first application 330, can communicate with the authentication server 370 through an intermediate server that reroutes an authentication request to the authentication server 370. For example, if the first application 330 is an email client, access to an email account can be controlled by an email server such as a MICROSOFT EXCHANGE server. In that example, the email server can be configured to route an authentication request to the authentication server 370.

The authentication server 370 can generate or access a script 375. As described in previous examples, the script 375 can be loaded to the component 350 executing on the user device 310 and can include multiple portions. In a first portion, the script 375 can include the unique request identifier. This can include, for example, a unique request identifier token that accompanies the script 375 or a header, payload, or other portion of the script 375 that includes the unique request identifier.

In a second portion, the script 375 can include an instruction to confirm enrollment of the user device 310. The instruction can trigger a background service on the user device 310 that determines whether the user device 310 is enrolled with the management server 380. In the example of an ANDROID operating system, the script 375 can include an "intent" as the instruction that triggers the enrollment inquiry.

In some examples, the script 375 is generated at or by the authentication server 370. But the script 375 can also be generated at another device, such as a device dedicated to script generation, or at the user device 310 itself.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. An authentication method to provide single-sign on ("SSO") to a first application that is not SSO enabled, comprising:
    receiving, at an authentication server, a request to authenticate the first application executing on a user device;
    assigning a unique request token to the request from the first application;
    loading a script to a component that executes on the user device and displays content within the first application, wherein the script:
        includes the unique request token, and
        causes a portal application executing on the user device to launch, wherein the portal application provides SSO access to the first application by authenticating the user, and wherein the portal application displays icons corresponding to a plurality of applications available to the user;
    receiving, at the authentication server from the portal application, an authentication request that includes the unique request token and an access token accessible to the portal application;
    validating the authentication request; and
    authenticating the user at the first application.

2. The method of claim 1, wherein the script causes the portal application to confirm enrollment of the user device.

3. The method of claim 1, wherein the component implements a WebView class of an operating system.

4. The method of claim 1, wherein validating the authentication request comprises requesting a refreshed access token from the portal application.

5. The method of claim 1, further comprising redirecting the user to an authentication interface for the authentication server after a predetermined time period elapses without having authenticated the user at the first application.

6. The method of claim 1, wherein the first application is not within the plurality of applications selectable from within the portal application.

7. A non-transitory, computer-readable medium comprising instructions that, when executed by a processor of a computing device, perform stages for providing single-sign on ("SSO") authentication to a first application that is not SSO enabled, the stages comprising:
    receiving, at an authentication server, a request to authenticate the first application executing on a user device;
    assigning a unique request token to the request from the first application;
    loading a script to a component that executes on the user device and displays content within the first application, wherein the script:
        includes the unique request token, and
        causes a portal application executing on the user device to launch, wherein the portal application provides SSO access to the first application by authenticating the user, and wherein the portal application displays icons corresponding to a plurality of applications available to the user;
    receiving, at the authentication server from the portal application, an authentication request that includes the unique request token and an access token accessible to the portal application;
    validating the authentication request; and
    authenticating the user at the first application.

8. The non-transitory, computer-readable medium of claim 7, wherein the script causes the portal application to confirm enrollment of the user device.

9. The non-transitory, computer-readable medium of claim 7, wherein the component implements a WebView class of an operating system.

10. The non-transitory, computer-readable medium of claim 7, wherein validating the authentication request comprises requesting a refreshed access token from the portal application.

11. The non-transitory, computer-readable medium of claim 7, the stages further comprising redirecting the user to an authentication interface for the authentication server after a predetermined time period elapses without having authenticated the user at the first application.

12. The non-transitory, computer-readable medium of claim 7, wherein the first application is not within the plurality of applications selectable from within the portal application.

13. A system for providing single-sign on ("SSO") authentication to a first application that is not SSO enabled, comprising:
    an authentication server having a processor and memory storage;
    wherein the memory storage contains a non-transitory, computer-readable medium comprising instructions that, when executed by the processor, carry out stages comprising:
        receiving, at an authentication server, a request to authenticate the first application executing on a user device;
        assigning a unique request token to the request from the first application;
        loading a script to a component that executes on the user device and displays content within the first application, wherein the script:
            includes the unique request token, and
            causes a portal application executing on the user device to launch, wherein the portal application provides SSO access to the first application by authenticating the user, and wherein the portal application displays icons corresponding to a plurality of applications available to the user;
        receiving, at the authentication server from the portal application, an authentication request that includes the unique request token and an access token accessible to the portal application;
        validating the authentication request; and
        authenticating the user at the first application.

14. The system of claim 13, wherein the script causes the portal application to confirm enrollment of the user device.

15. The system of claim 13, wherein validating the authentication request comprises requesting a refreshed access token from the portal application.

16. The system of claim 13, the stages further comprising redirecting the user to an authentication interface for the authentication server after a predetermined time period elapses without having authenticated the user at the first application.

17. The system of claim 13, wherein the first application is not within the plurality of applications selectable from within the portal application.

\* \* \* \* \*